UNITED STATES PATENT OFFICE.

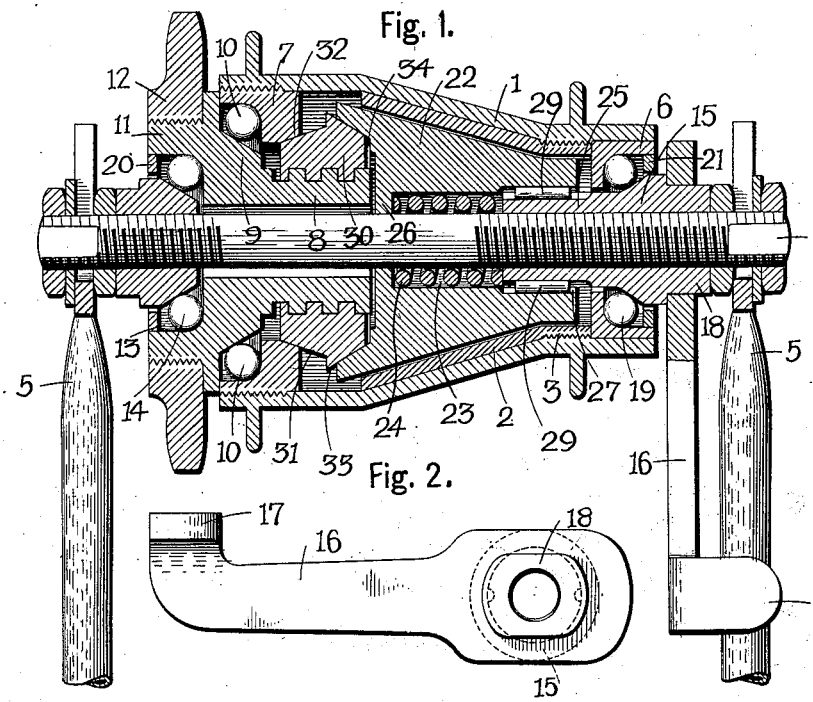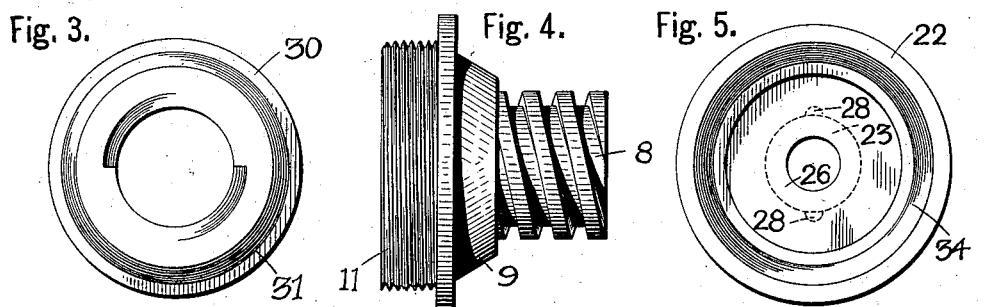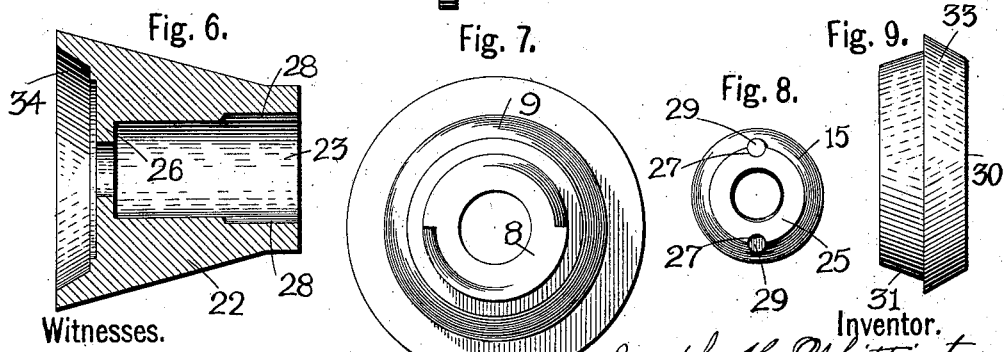

JOSEPH H. WHITTINGTON, OF BUFFALO, NEW YORK, ASSIGNOR, BY MESNE ASSIGNMENTS, TO JOHN H. PRICE, OF AKRON, NEW YORK.

BACK-PEDALING COASTER-BRAKE.

1,023,347.  Specification of Letters Patent.  Patented Apr. 16, 1912.

Application filed December 17, 1903. Serial No. 185,533.

*To all whom it may concern:*

Be it known that I, JOSEPH H. WHITTINGTON, a citizen of the United States, residing at Buffalo, in the county of Erie and State of New York, have invented certain new and useful Improvements in Back-Pedaling Coaster-Brakes, of which the following is a specification.

This invention relates to an improved back pedaling coaster brake in which the brake is applied by a lateral movable element which is shifted by a clutch device operated by the back pedaling movement of the driving mechanism.

The main objects of the invention are to arrange a simple and comparatively light mechanism which permits free coasting of the vehicle and enables an instantaneous application of the brake.

The invention also relates to certain details of construction in the adaptation of the device shown, all of which will be fully and clearly hereinafter described and claimed reference being had to the accompanying drawings, in which,—

Figure 1 represents a longitudinal central section through a hub embodying one form of a brake constructed in accordance with my invention, also showing fragments of the rear tubes of a bicycle in which the hub is arranged. Fig. 2 is a detached face view of the lock arm or lever. Fig. 3. is a detached outer face or end view of the tapered ring. Fig. 4 is a detached side elevation of the driving and operating member. Fig. 5 is a face or end view of the movable brake member. Fig. 6 is a central longitudinal section through the brake member. Fig. 7 is an inner end view of the driving and operating member. Fig. 8 is an inner end view of the fixed cone. Fig. 9 is a side view of the tapered ring.

In referring to the drawings for the details of construction, like numerals designate like parts.

The invention generically considered resides in a brake device which is applied by back pedaling or reverse movement of the driving mechanism through an intermediate clutch mechanism and while I have illustrated and shall hereinafter describe one form of the invention, I can realize the many changes in form and in construction which may be made without materially departing from the above principle and I therefore expressly reserve the right to all other forms or constructions which fall within the scope of the annexed claims.

In the form shown 1 represents the hub which may if desired be in the tapering form shown. A tapering conical metal shoe 2, which constitutes the rotatable braking member is fitted within the hub; being provided with a screw threaded reduced end 3, which screws into a corresponding screw threaded cut in the inner surface of the hub. The spindle or shaft 4, passes centrally through the hub and is supported at its ends in the forks of the rear frame members 5. A bearing case 6, is pressed or rigidly fitted in the reduced end of the hub abutting against the outer end of the shoe 2, and a similar bearing case 7, is screwed into the opposite end of the hub. A driving and operating member which consists of an integrally formed element having an inner screw threaded sleeve 8, an intermediate cone 9, between which and the bearing case 7, an inner series of antifriction balls 10, are located, and an outer sprocket support 11, upon which a sprocket 12, or equivalent power transmitting device is mounted. The sprocket support 11, is externally recessed, as shown at 13, in Fig. 1, to constitute a bearing case for an outer set of ball bearings 14, and a cone for said set of bearings is adjustably screwed upon the end of the spindle or axle which serves to adjust all of the bearings by its longitudinal movement on the axle. At the opposite side of the hub, a cone 15, is screwed upon the spindle or axle being held rigidly thereon by the lock arm or lever 16, which engages with the cone and has a lug 17, fitting against the frame.

To prevent the cone 15, rotating, the lock arm is provided with an opening of oblong shape or any equivalent out of round form, and a projecting part 18, of the cone is formed to correspond and fit through the opening.

A set of antifriction balls 19, are placed between the cone 15, and the bearing case 6.

20 and 21 represents the usual dust guards or rings.

A movable conical brake member 22, is slidably supported on the spindle or shaft and has a deep recess or depression 23, in which a spiral spring 24, is arranged, and the inner end 25, of the cone 15, is of sufficient length to extend or project within said recess or depression 23, and form a shoulder or abutment for one end of the spring 24. The opposite end of the spring abuts against the annular shoulder 26, at the termination of the recess or depression 23, as shown in Fig. 1.

To prevent the movable brake member rotating, longitudinal grooves 27, are cut in the periphery of the projecting inner part 25, of the cone and corresponding longitudinal grooves 28, in the inner surface of the brake member which together form longitudinal openings of substantially circular cross section in which lock keys 29, are fitted, see Fig. 1.

The movable brake member is shifted into braking contact with the rotatable braking member or shoe by a clutch ring 30, which is internally screw threaded to engage the screw threads on the sleeve 8, and externally tapered from the center toward each end, as shown in Figs. 1 and 9.

The outer tapering surface 31, is adapted to engage in the tapering recess 32, in the bearing case 7, and the inner tapering surface 33, in the shallow tapering recess 34, in the inner or larger end of the movable braking member.

In the operation of this device back pedaling or reverse movement of the driving mechanism causes the screw threaded sleeve to carry the tapering clutch ring into contact with the movable brake member and forces said movable brake member into contact with the rotatable brake member. When the back pedaling pressure is released the spring 24, immediately returns the movable brake member to its former position. In coasting, the driving mechanism is stationary and the hub revolves independently on the bearings.

I claim as my invention:

1. In a coaster brake, in combination, an axle, a wheel hub, a driver having a connected sleeve projected within the hub, anti-friction bearings between the hub and axle, a driving clutch for connecting said sleeve and hub upon the forward turning of the driver, a brake member carried by the hub, a laterally movable brake member, means for moving said movable brake member into engagement with the brake member carried by the hub upon the backward turning of the driver; said movable brake member having a deep longitudinal depression, a central longitudinal opening the greater portion of which is sufficiently larger than the axle to provide a deep annular recess between the axle and circular wall of the opening extending from one end of the brake member to near the opposite end and being contracted at the termination of the recess to fit fairly close around the axle and provide an annular shoulder, and a spring for normally maintaining the brake members out of frictional engagement; said spring being completely inclosed in the annular recess between the movable brake member and the axle and one of the cones of the anti-friction bearings having an extension which projects into the outer end of the central longitudinal opening in the movable brake member to hold the spring in place and also center the outer end of the movable brake member on the axle, substantially as set forth.

2. In a coaster brake, in combination, an axle, a wheel hub, a driver having a connected sleeve projected within the hub, anti-friction bearings between the hub and axle, a driving clutch for connecting said sleeve and hub upon the forward turning of the driver, a brake member rigidly attached to the hub, a laterally movable brake member, means for moving said movable brake member into engagement with the brake member rigidly attached to the hub upon the backward turning of the driver; said movable brake member having a deep longitudinal depression, a central longitudinal opening the greater portion of which is sufficiently larger than the axle to provide a deep annular recess between the axle and circular wall of the opening extending from one end of the brake member to near the opposite end and being contracted at the termination of the recess to fit fairly close around the axle and provide an annular shoulder, and a spring for normally maintaining the brake members out of frictional engagement; said spring being completely inclosed in the annular recess between the movable brake member and the axle and one of the cones of the anti-friction bearings having an extension which projects into the outer end of the central longitudinal opening in the movable brake member to hold the spring in place and also center the outer end of the movable brake member on the axle, substantially as set forth.

JOSEPH H. WHITTINGTON.

Witnesses:
L. M. SANGSTER,
GEO. A. NEUBAUER.